(12) United States Patent
Beese

(10) Patent No.: US 8,090,508 B2
(45) Date of Patent: Jan. 3, 2012

(54) METHOD AND SYSTEM FOR DETERMINING A PLANNED PATH FOR A MACHINE

(75) Inventor: Zachary E. Beese, Ames, IA (US)

(73) Assignee: Deere & Company, Moline, IL (US)

( * ) Notice: Subject to any disclaimer, the term of this patent is extended or adjusted under 35 U.S.C. 154(b) by 473 days.

(21) Appl. No.: 12/413,922

(22) Filed: Mar. 30, 2009

(65) Prior Publication Data

US 2010/0161183 A1  Jun. 24, 2010

Related U.S. Application Data

(60) Provisional application No. 61/139,965, filed on Dec. 22, 2008.

(51) Int. Cl.
 *E02F 3/76* (2006.01)
(52) U.S. Cl. .......................... 701/50; 172/4.5
(58) Field of Classification Search .............. 37/347, 37/348, 466; 172/2–11; 701/50, 207, 209
See application file for complete search history.

(56) References Cited

U.S. PATENT DOCUMENTS

| | | | | |
|---|---|---|---|---|
| 4,503,630 A | * | 3/1985 | Riley | 37/94 |
| 4,563,826 A | * | 1/1986 | Whitaker, Jr. | 37/97 |
| 5,559,725 A | | 9/1996 | Nielson et al. | |
| 5,764,511 A | | 6/1998 | Henderson | |
| 5,964,298 A | | 10/1999 | Greenspun | |
| 6,070,673 A | | 6/2000 | Wendte | |
| 6,236,907 B1 | * | 5/2001 | Hauwiller et al. | 700/283 |
| 6,417,641 B2 | | 7/2002 | Peless et al. | |
| 6,549,852 B2 | | 4/2003 | Hanson | |
| 6,655,465 B2 | | 12/2003 | Carlson et al. | |
| 6,843,006 B1 | * | 1/2005 | Montgomery | 37/465 |
| 6,880,643 B1 | | 4/2005 | Zimmerman et al. | |
| 7,079,931 B2 | | 7/2006 | Sahm et al. | |
| 7,315,800 B2 | | 1/2008 | Meiners et al. | |
| 2002/0162668 A1 | | 11/2002 | Carlson et al. | |
| 2003/0220734 A1 | | 11/2003 | Harrison et al. | |
| 2005/0010379 A1 | | 1/2005 | Meiners et al. | |

(Continued)

FOREIGN PATENT DOCUMENTS

DE    102006004938    8/2007

OTHER PUBLICATIONS

Delta Farm Press, Russian GLONASS covers GPS gaps [online]. Apr. 1, 2005 [retrieved on Jun. 20, 2007]. Retrieved from the Internet: <URL:http://deltafarmpress.com/mag/farming_russian_glonass_covers/>.

(Continued)

*Primary Examiner* — Robert Pezzuto

(57) ABSTRACT

A location-determining receiver collects terrain data within a work area. The terrain data comprises elevation data and corresponding location data. A path planning module or data processor defines a planned path for a drainage channel. The planned path comprises a starting point with first coordinates and a termination point with second coordinates within the work area. The drainage channel extends from the starting point to the end point such that the starting point has a higher elevation than the termination point. A user interface establishes constraint data comprising a minimum cut parameter, a maximum cut parameter, a minimum slope parameter and a maximum slope parameter. A data processor determines a validated path for the planned path or a digging plan based on compliance with the constraint data.

17 Claims, 5 Drawing Sheets

U.S. PATENT DOCUMENTS

| | | |
|---|---|---|
| 2006/0025971 A1 | 2/2006 | Detwiler et al. |
| 2006/0122794 A1 | 6/2006 | Sprague et al. |
| 2007/0129869 A1 | 6/2007 | Gudat et al. |

OTHER PUBLICATIONS

AGPS Advanced Geo Positioning Solutions. AGPS-Ditch Pro [online advertisement]. [retrieved on Apr. 8, 2009]. Retrieved from the Internet: <URL:http://www.agpsinc.com/ditch.htm>.

Scientific Soltware Group. Filter Drain [online products brochure]. [retrieved on Mar. 30, 2009]. [Retrieved from the Internet: <URL:http://www.scientificsoftwaregroup.com/pages/detailed_description.php?products_id=89>.

Scientific Soltware Group, SMS—Surface Water Modeling System [online products brochure]. [retrieved on Mar. 30, 2009]. [Retrieved from the Internet: <URL:http://www.scientificsoftwaregroup.com/pages/detailed_description.php?products_id=119>.

Scientific Soltware Group. HEC-RAS [online products brochure]. [retrieved on Mar. 30, 2009]. [Retrieved from the Internet: <URL:http://www.scientificsoftwaregroup.com/pages/detailed_description.php?products_id=182>.

Scientific Soltware Group, AQUA3D [online products brochure]. [retrieved on Mar. 30, 2009]. [Retrieved from the Internet: <URL:http://www.scientificsoftwaregroup.com/pages/detailed_description.php?products_id=31>.

* cited by examiner

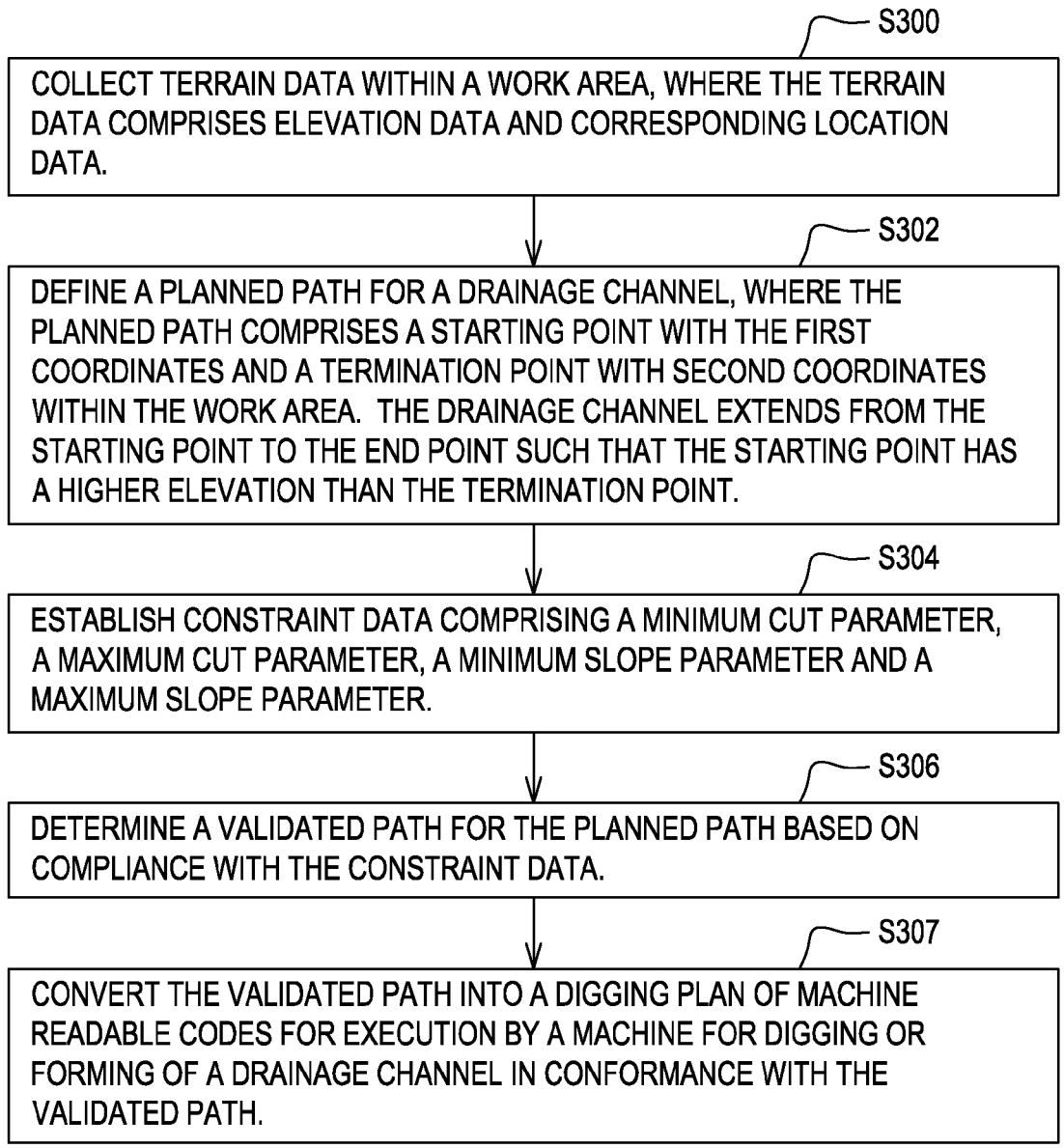

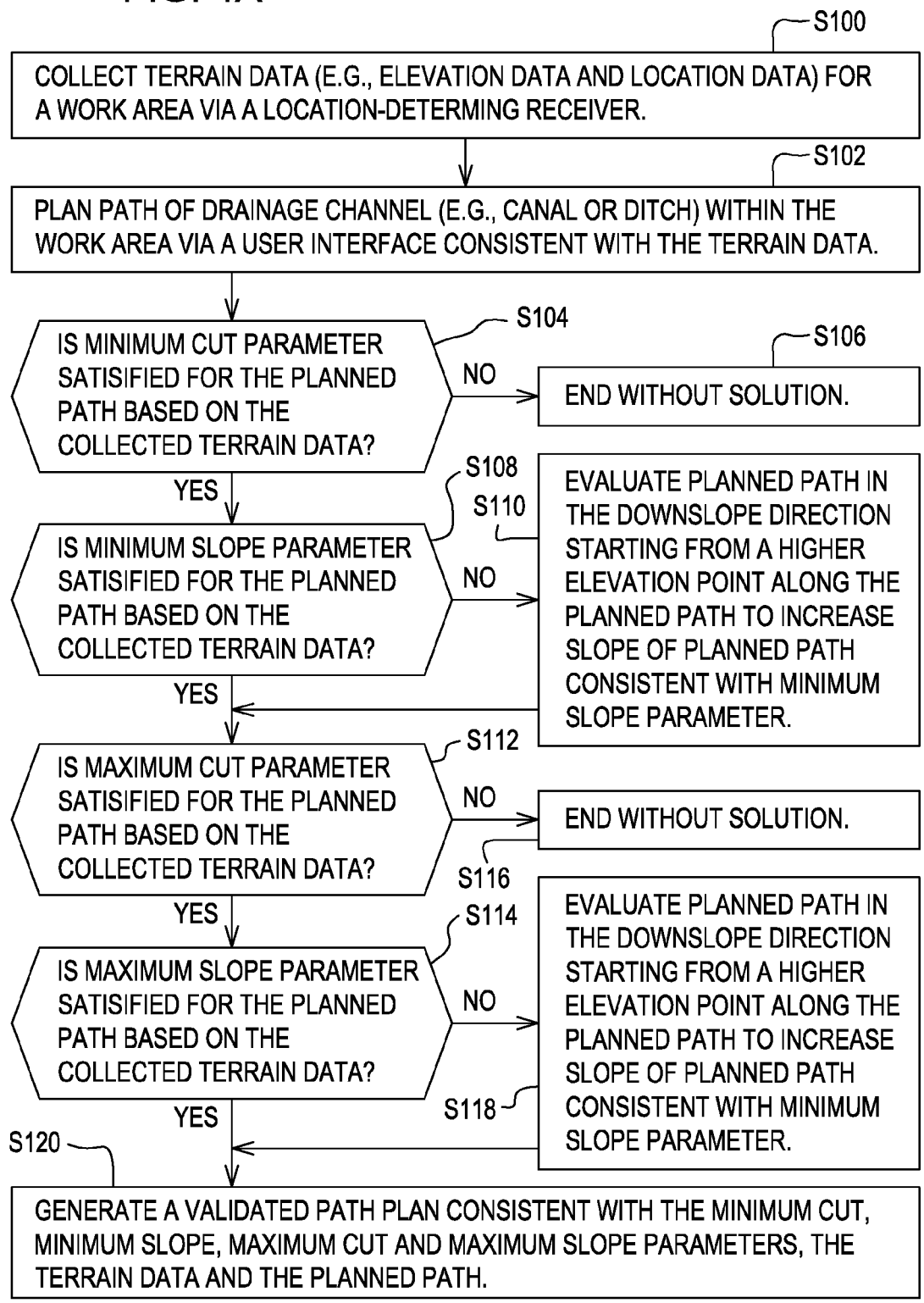

FIG. 4B

S122: CONVERT VALIDATED PATH PLAN INTO A DIGGING PLAN HAVING MACHINE CONTROL CODES TO EXECUTE THE DIGGING OR CONSTRUCTION OF THE DRAINAGE CHANNEL.

S124: DIG OR CONSTRUCT THE DRAINAGE CHANNEL IN CONFORMANCE WITH THE MACHINE CONTROL CODES AND THE DIG PLAN.

METHOD AND SYSTEM FOR DETERMINING A PLANNED PATH FOR A MACHINE

This document (including all drawings) claims priority based on U.S. provisional application Ser. No. 61/139,965, filed Dec. 22, 2008, and entitled, METHOD AND SYSTEM FOR DETERMINING A PLANNED PATH FOR A MACHINE, under 35 U.S.C. 119(e).

FIELD OF THE INVENTION

This invention relates to a method and system for determining a planned plan for a machine for construction or digging of a drainage channel.

BACKGROUND

The prior art may determine a design of a drainage channel based on hydraulic considerations, for example. In agricultural and landscape applications, the operator of a machine may be concerned with minimizing time and/or cost of construction of the drainage channel. Thus, there is a need for an improved method and system for determining a digging plan for a machine.

SUMMARY OF THE INVENTION

In accordance with one embodiment, a system or method for providing a planned plan for a machine for digging a drainage channel comprises a location-determining receiver for collecting terrain data within a work area. The terrain data comprises elevation data and corresponding location data. A path planning module or data processor defines a planned path for a drainage channel in or through the terrain. The planned path comprises a starting point with first coordinates and a termination point with second coordinates within the work area. The drainage channel extends from the starting point to the termination point such that the starting point has a higher elevation than the termination point. A user interface establishes constraint data comprising a minimum cut parameter, a maximum cut parameter, a minimum slope parameter and a maximum slope parameter. A data processor determines a validated path for the planned path or a digging plan based on compliance with the constraint data.

BRIEF DESCRIPTION OF THE DRAWINGS

FIG. 3 is a flow chart of one example of a method for determining a digging plan for a machine for construction or digging of a drainage channel.

FIG. 4A and FIG. 4B, collectively, are a flow chart of another example of a method for determining a digging plan for a machine for construction or digging of a drainage channel.

FIG. 5A and FIG. 5B, collectively, represent an illustrative example of modifying the dig plan to meet constraint data.

DESCRIPTION OF THE PREFERRED EMBODIMENT

Figure 1:
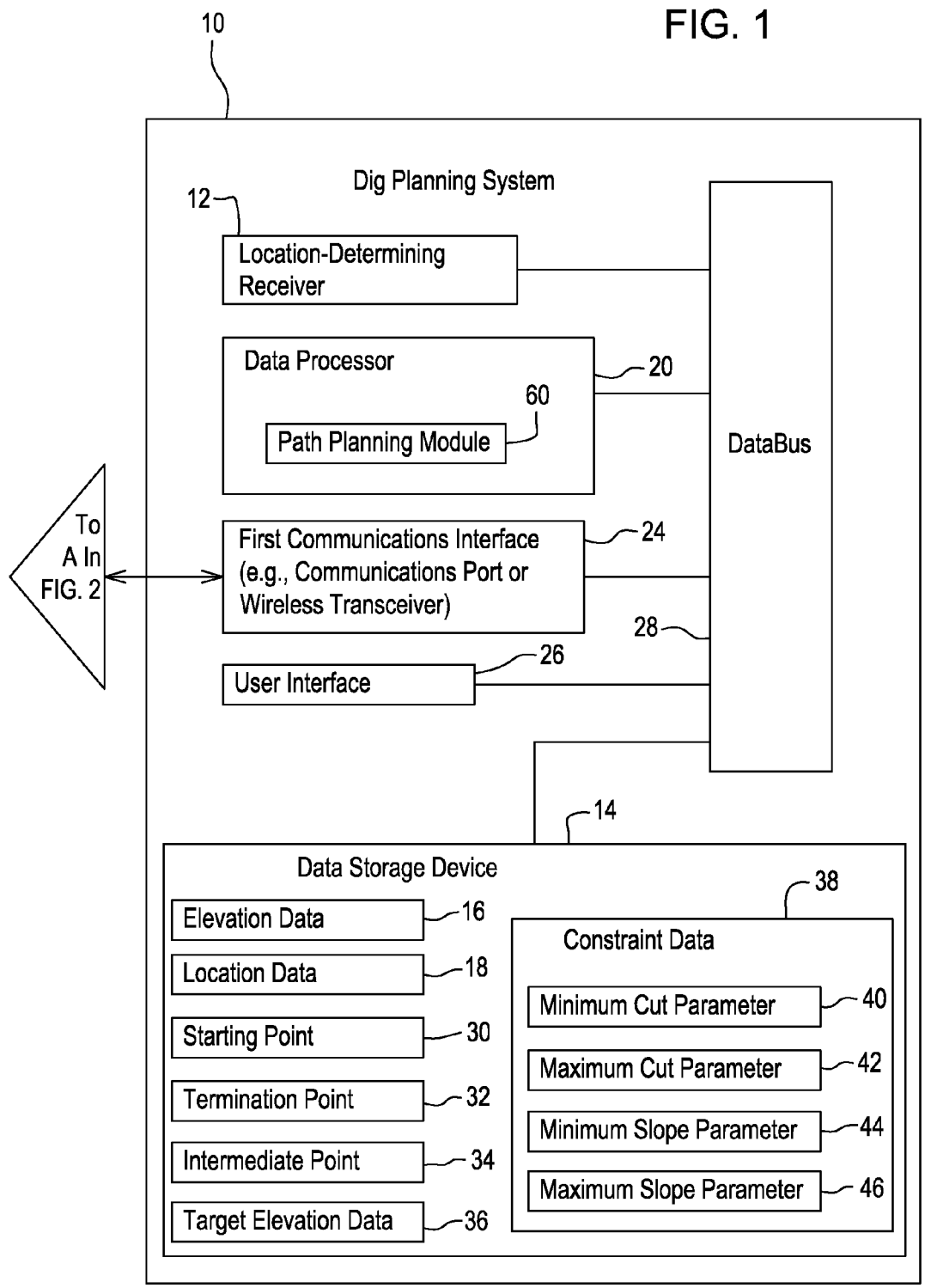
FIG. 1 is a block diagram of one embodiment of a system for determining a planned path or validated plan for a machine for construction or digging of a drainage channel.

In accordance with one embodiment, the dig planning system 10 of FIG. 1 comprises a location-determining receiver 12, a data storage device 14, a data processor 20, and a first communications interface 24, and a user interface 26 coupled to a data bus 28. The data processor 20 may communicate with one or more of the following via the data bus 28: the location-determining receiver 12, the data storage device 14, the first communications interface 24, and the user interface 26.

The location-determining receiver 12 may comprise a global positioning system (GPS) receiver, a GPS receiver with differential correction, or another receiver for receiving reference signals from satellite or terrestrial reference transmitters to facilitate the determination of a location, heading, velocity or any combination of the foregoing items, of the location-determining receiver 12. For example, the location-determining receiver 12 determines a position of the location-determining receiver 12 or terrain data for a work area in which a drainage system or channel is planned. The terrain data comprises elevation data 16 (e.g., height above average terrain or height above mean sea level) and location data 18 (e.g., coordinates) that may be sampled in a grid, at points, or along paths within a work area, for example.

The data processor 20 comprises a microprocessor, a controller, a microcontroller, a digital logic circuit, a programmable logic array, an application specific integrated circuit (ASIC), or another data processing device. The data processor 20 may further comprise a path planning module 60. The path planning module 60 may comprise a software module, an electronic module, or any combination of the foregoing.

The path planning module 60 is arranged to (a) define a planned path for a drainage channel, and (b) validate the planned path as a validated path that complies with the constraint data, or both. The drainage channel may comprise a ditch, a channel, an irrigation canal, or another mechanism for draining or supplying water or other liquid between two points or locations (e.g., a starting point and a termination point). The planned path comprises at least a starting point 30 that is associated with first terrain data (e.g., respective first coordinate data and corresponding first elevation data) and a termination point 32 associated with second terrain data (e.g., respective second coordinate data and corresponding second elevation data) within the work area. The drainage channel extends from the starting point 30 to the termination point 32 such that the starting point 30 has a higher elevation than the termination point 32 to foster the flow of water downward in the drainage channel with gravity.

In one embodiment, the planned path may comprise a starting point 30, a termination point 32, and one or more intermediate points 34 between the starting point and the termination point. Accordingly, the planned path may be defined by a series of vertices that are interconnected with path segments, where each vertex among the vertices defined by elevation data 16 (e.g., the "z" Cartesian coordinate) and corresponding location data 18 (e.g., x and y coordinates or Cartesian coordinates). The starting point 30, the termination point 32, and any intermediate point between the starting point 30 and the termination point 32 may be expressed as vertices. Typically, a vertex is associated with a transition in slope, elevation or height of the planned path.

In one embodiment, the path planning module 60 comprises a search engine for changing the slope of one or more path segments (between adjacent vertices) of the planned path incrementally and iteratively until the maximum slope parameter 46, the minimum slope parameter 44, or both are satisfied. In one example, the path planning module 60 may comprise a search engine for increasing the slope of one or more path segments of the planned path incrementally and iteratively until the minimum slope parameter 44 is satisfied.

In another example, the path planning module 60 may comprise a search engine for decreasing the slope of one or more path segments the planned path incrementally and iteratively until the maximum slope parameter 46 is satisfied. Target elevation data 36 is a target point for a corresponding vertex, intermediate point 34, starting point 30, or termination point 32 of the planned path.

The data storage device 14 may comprise electronic memory, a magnetic storage device, an optical storage device, a hard disk, non-volatile random access memory, computer memory, or another device for storing data (e.g., digital data). The data storage device 14 may store, retrieve or access one or more of the following types of data: elevation data 16, location data 18, a starting point 30, a termination point 32, an intermediate point 34, target elevation data 36, and constraint data 38. Constraint data 38 may comprise a minimum cut parameter 40, a maximum cut parameter 42, a minimum slope parameter 44 and a maximum slope parameter 46.

The first communications interface 24 may comprise an input/output data port, a communications port, a transmitter, a receiver, a wireline transceiver, or a wireless transceiver. In one embodiment, the first communications interface 24 may comprise buffer memory for storing data that is received from the data bus 28 or another data source, transmitted to the data bus 28, or to another data recipient. The input/output data port may comprise a transceiver, such as a universal asynchronous receiver/transmitter.

The user interface 26 may comprise a keyboard, a keypad, a pointing device (e.g., an electronic mouse), a display, a switch, a control panel or another device for entering input data, selecting data or viewing output data for the dig planning system 10. For example, the user interface 26 may support the entry or selection of path data, a starting point 30 for a planned path for a drainage channel, a termination point 32 for a planned path for a drainage channel, an intermediate point 34 for a planned path for a drainage channel, and a target elevation data 36. A user may enter a ground path over the terrain that defines the location data (e.g., x, y coordinates) for the planned path or instruct the location-determining receiver 12 to collect the location data over a similar path that is traced by the user, whereas the path planning module 60 determines the depth or Z coordinate for the path below the ground path. Further, the user interface 26 may support the entry or selection of constraint data 38 or particular values of a minimum cut parameter 40 parameter, a maximum cut parameter 42, a minimum slope parameter 44, and a maximum slope parameter 46, where the particular values are based on an operator's experience, the geographic area in which the operator operates, the soil or ground material composition, the moisture content of the soil or ground material, or the like. Accordingly, the user interface 26 and the dig planning system 10 can readily accept real world data to customize the constraint data for observations or conditions within the work area.

Figure 2:
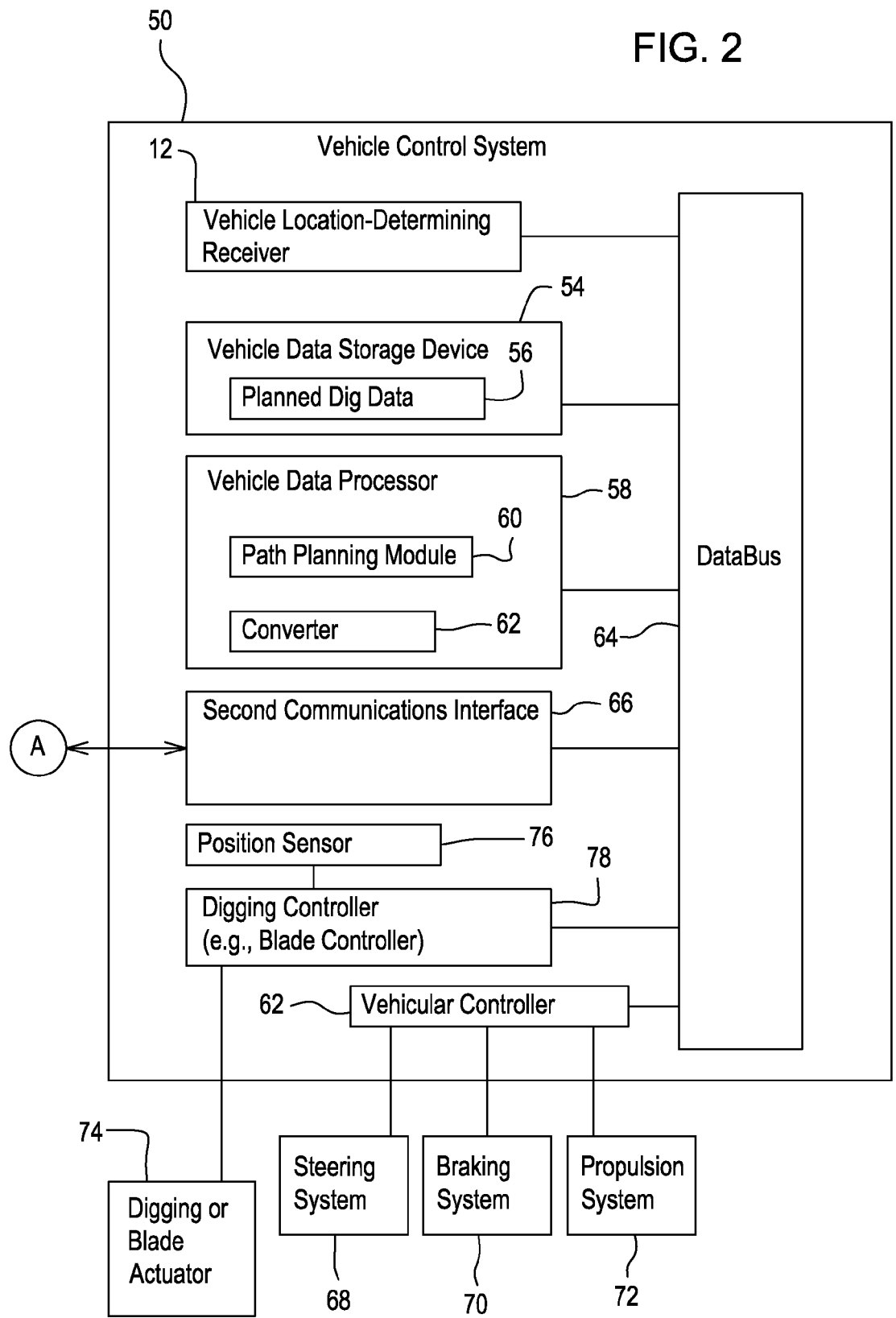
FIG. 2 is a block diagram of one embodiment of a system for executing a digging plan for a machine for construction of digging of a drainage channel.

FIG. 2 illustrates a vehicle control system 50 for using a planned path or dig plan determined in accordance with the dig planning system 10 of FIG. 1. The dig planning system 10 of FIG. 1 and the vehicle control system 50 of FIG. 2 may communicate with each other via the communications interfaces (66, 24) as later described in greater detail. Like reference numbers in FIG. 1 and FIG. 2 indicate like elements.

In FIG. 2, the vehicle control system 50 comprises a vehicle location-determining receiver 112, a vehicle data storage device 54, a vehicle data processor 58, second communications interface 66, and a vehicular controller 62, a digging controller 78, and a position sensor 76. The vehicle location-determining receiver 112, the vehicle data storage device 54, the vehicle data processor 58, second communications interface 66, and a vehicular controller 62, a digging controller 78 are coupled to data bus 64. The vehicle data processor 58 may communicate with one or more of the following components via the data bus 28: the vehicle location-determining receiver 112, the vehicle data storage device 54, the vehicle data processor 58, the vehicular controller 62, and the digging controller 78.

The vehicle location-determining receiver 112 may comprise a global positioning system (GPS) receiver, a GPS receiver with differential correction, or another receiver for receiving location data from satellite or terrestrial reference transmitters. The location-determining receiver 112 determines a position of the vehicle, the location-determining receiver 112, or terrain data.

The vehicle data processor 58 comprises a microprocessor, a controller, a microcontroller, a digital logic circuit, a programmable logic array, an application specific integrated circuit (ASIC), or another data processing device. The vehicle data processor 58 may further comprise a path planning module 60 and a converter 62. The path planning module 60 may comprise a software module, an electronic module, or any combination of the foregoing.

The converter 58 may comprise a look-up table, an equation, a database, logic rules, or a mapping function to convert the planned path (e.g., validated path) from the path planning module 60 into a dig plan. The dig plan may comprise a series or sequence of machine control codes to execute one or more tasks related to the digging or construction of the drainage channel, or a path segment of the drainage channel, in accordance with the planned path (e.g., validated path).

The vehicular controller 62 and the digging controller 78 may receive path planning data from the path planning module 60, a dig plan from the converter 62, or the data processor 20. In response to the validated path or dig plan, the vehicular controller 62 may generate control data for the propulsion system 72, the steering system 68 and the braking system 70 to carry out the planned path or dig plan. Similarly, in response to the validated path or dig plan, the digging controller 78 may generate control data from the digging or blade actuator 74 to carry out the path plan.

The second communications interface 66 may comprise an input/output data port, a communications port, a transmitter, a receiver, a wireline transceiver, or a wireless transceiver. In one embodiment, the second communications interface 66 may comprise buffer memory for storing data that is received from the data bus 64 or another data source, transmitted to the data bus 64, or to another data recipient. The input/output data port may comprise a transceiver, such as a universal asynchronous receiver/transmitter.

The vehicular controller 62 is coupled, directly or indirectly, to the propulsion system 72, the steering system 68 and the braking system 70 of the vehicle. The vehicular controller 62 is capable of generating control signals or control data to control the propulsion system 72, the steering system 68 and the braking system 70 of the vehicle.

For the propulsion system 72, the vehicular controller 62 may comprise an inverter, a chopper circuit, a variable voltage source, an oscillator, a variable current source, a direct current supply, an alternating current supply, or any data processing device for controlling a propulsion system 72. The vehicular controller may further comprise a logic circuit, a data processing system or another device for generating an analog or digital control signal for the steering system 68 and braking system 70.

The propulsion system 72 may comprise an electric motor, an internal combustion engine, a hybrid propulsion system, or another device for propelling the vehicle. A hybrid propulsion system may comprise an internal combustion engine that provides rotational energy to an alternator or generator for charging an energy storage device (e.g., battery) coupled to one or more electric motors. The propulsion system 72 may be arranged to impart rotational energy from one or more wheels (or tracks) to the ground or another surface below the vehicle.

The steering system 68 may comprise an electrically controlled steering system, an electro-hydraulic steering system, a solenoid controlled steering system, or another system for changing the direction of one or more wheels of the vehicle. In an alternative embodiment, the steering system 68 may comprise a skid steering system in which differential rotation rates are applied by the propulsion system 72 to different wheels to steer the vehicle.

The braking system 70 may comprise an electrically controlled braking system, an electro-hydraulic braking system, a solenoid braking system, or another system for stopping or decelerating the vehicle.

The position sensor 76 comprises an optical positioning system, a laser positioning system, or an auxiliary location-determining receiver for determining the position of an implement (e.g., with respect to the ground or a fixed reference point on the vehicle carrying the vehicle control system 50). The implement may comprise one or more of the following: digging blade, blade, drill, scraper, shovel, spade, scoop, cutter, trencher or other tool of the machine for digging a drainage channel. If a location-determining receiver 112 is used, an antenna of the location-determining receiver 112 may be mechanically secured to or linked to the implement. The location-determining receiver 112 is connected to the antenna via transmission line (e.g., coaxial cable), such that the location-determining receiver 112 is isolated from the implement; and hence, exposure to debris (e.g., displaced soil), shock and vibration associated with digging of the drainage channel.

If the position sensor 76 comprises a laser or optical positioning system, the laser positioning system or optical positioning system may comprise a transmitter (e.g., a laser source) and a detector or group of detectors (e.g., photovoltaic sensors or cells). The transmitter may transmit an electromagnetic signal (e.g., a pulse) toward the ground or fixed reference position on the machine and the detector receives a reflection of the transmitted signal from the ground or reference position to estimate a phase change or time of travel of the electromagnetic signal. The electromagnetic signal travels approximately at the speed of light. Accordingly, the time of travel may be converted to an estimated distance based on the elapsed time or detected phase change, which provides an indication or three-dimensional position of the implement (e.g., tool, digging implement, cutter, shovel, scoop, or the like) including its above the ground level at any particular location (e.g., coordinates) of the machine.

The location-determining receiver 112 may be used to determine the particular position of the machine or its coordinates, even where the position sensor 76 comprises a laser positioning system or another device for estimating a position or height of the implement. In one configuration, the positioning sensor 76 may measure the distance and angle between it and a fixed reference point on the machine or ground to estimate a relative position of the implement.

The actuator 74 may comprise a hydraulic actuator, an electrical actuator 74, a linear motor, an electric motor, an electro-hydraulic actuator 74, a solenoid, a servo-motor, or the like. The actuator 74 is mechanically connected to or coupled the implement (e.g., a blade, cutter, scoop, drill or tool) of the machine for digging the drainage channel. The actuator 74 imparts force or movement to the implement of the machine in accordance with a desired depth, consistent with the planned path, the dig plan, and the constraint data 38. The digging controller 78 sends control signals to the actuator 74 for digging or constructing the drainage channel in conformance with the machine control codes and the dig plan.

The digging controller 78 comprises a blade or implement position controller that provides a depth, position or other orientation for the blade or other implement, consistent with the planned path, the dig plan and the constraint data 38. The digging controller 78 receives location data 18 or position data from the location-determining receiver 12 for the machine location and implement position data from the position sensor 76 regarding the position of the blade or other implement with respect to the machine (e.g., or with respect to world coordinates).

In one embodiment, the dig planning system 10 of FIG. 1 determines a dig plan for a path plan or a validated path plan for a drainage channel that is transferred to a vehicle control system 50 of FIG. 2. The path plan or validated path plan may be transferred via the first communications interface 24 and a second communications interface 66 of the vehicle control system 50. In practice, the vehicle control system 50 may be carried by or mounted on a vehicle, machine or equipment for digging, excavating or constructing a drainage channel.

FIG. 3 illustrates a method for determining a digging plan for a machine for construction or digging of a drainage channel. The method of FIG. 3 begins in step S300.

In step S300, the location-determining receiver 12 collects terrain data within a work area, where the terrain data comprises elevation data 16 and corresponding location data 18. The location data 18 indicates a position of a machine or vehicle within the work area. For example, the vehicle may survey the surface terrain of the area to compile or collect a three-dimensional representation of the terrain of the work area or a map. The terrain data may be limited, but need not be limited, to a zone, area or strip around a ground path plan defined by location data 18 (e.g., x, y coordinates) for the planned path of the drainage channel. If the terrain data is limited, the capacity of the data storage device 14 may be reduced, for instance.

In step S302, the path planning module 60 or data processor 20 defines a planned path for a drainage channel (e.g., drainage ditch or canal), where the planned path comprises a starting point 30 with first coordinates and a termination point 32 with second coordinates within the work area. The drainage channel extends from the starting point 30 to the end point such that the starting point 30 has a higher elevation than the termination point 32.

In step S304, a user interface 26 or data processor 20 establishes constraint data 38 comprising a minimum cut parameter 40 parameter, a maximum cut parameter 42, a minimum slope parameter 44 and a maximum slope parameter 46. For example, the user interface 26 or data processor 20 may establish target values, ranges, or guidelines for the constraint data. The minimum cut parameter 40 comprises a minimum volume of material to be removed to form the drainage channel with a desired minimum cross section, a minimum width, minimum depth or a minimum flow rate for liquid to travel in a single stream. If the terrain or land is sloped downward from the starting point 30 to the termination point 32, the minimum cut parameter 40 may be easier to satisfy than if the terrain or land is sloped upward from the starting point 30 to the termination point 32. The minimum slope parameter 44 comprises a minimum incline for a liquid to flow from gravitational force. The maximum cut parameter 42 comprises a maximum volume of material to be removed to form the drainage channel, or the maximum depth below pre-existing topography or ground level that is cut away for the planned path. The maximum slope parameter 46 comprises the maximum incline for liquid to flow without material erosion of the drainage channel, or abrupt changes in the slope that are difficult to dig with the digging machine.

In step S306, a path planning module 60 or a data processor 20 determines a validated path for the planned path based on compliance with the constraint data 38. Step S306 may be carried out in accordance with various procedures that may be applied alternately or cumulatively. In accordance with a first procedure, the path planning module 60 or data processor 20 may attain the validated path plan by first, applying the minimum cut parameter 40 parameter; second, applying the minimum slope parameter 44; third, applying the maximum cut parameter 42; fourth, applying the maximum slope parameter 46.

In accordance with a second procedure, in step S306, the path planning module or the data processor 20 first considers or evaluates the constraint data 38 starting at the starting point 30 and working downward until a constraint violation occurs that is associated with one or more vertex points of the planned path of the drainage channel. Second, the path planning module 60 or the data processor 20 attempts to relieve or solve the constraint violation by changing the offending or violating vertex point or points of the planned path of the drainage channel to compliant vertex point or points consistent with the constraints. Third, after the attempted relief or solution, the vertex points are examined upward (or backwards from the initial processing direction along the planned path.) The foregoing three steps may be repeated iteratively as a loop until the attempted relief or solution is successful or until no constraint violation occurs on a subsequent execution of the loop. The foregoing shift of the data processor 20 or path planning module 60 in evaluation direction from downward to upward supports efficient, rapid and reliable determination of the compliant vertex points for the planned path or dig plan. Adherence to the maximum cut parameter 42 fosters reduced cost by capping the fuel costs and labor time in cutting material through limiting a maximum volume of material to be removed to form the planned path or execute the dig plan.

In accordance with a third procedure, the data processor 20 or path planning module 60 iterates downward from a higher elevation (e.g., starting point 30) to a lower elevation along the planned path of the drainage channel. As the data processor 20 or path planning module 60 considers the compliance of vertices or path segments progressing downward along the planned path, the data processor 20 or path planning module 60 attempts to cut away only a minimum cut parameter 40 parameter to reduce the volume of soil or material removed. Each vertex or point (e.g., where there is a material transition or change in slope) is checked against the other parameters of the constraint data 38 for compliance, including the maximum cut parameter 42, the minimum slope parameter 44 and the maximum slope parameter 46. If a violation of any constraint data 38 occurs for the other parameters, a backward iteration is started to add deeper cuts to prior cuts in an attempt to satisfy the other parameters and the minimum cut parameter 40 parameter is no longer used for points or vertices where the other parameters have been violated. The minimum cut parameter 40 parameter is no longer used so that more soil or material can be cut away upslope from the violation to satisfy the down slope points and vertices of the planned path. To the extent that the minimum cut parameter 40 is satisfied for any points or vertices, the amount of material or soil removed from the ground is minimized; hence, the time and expense of construction of the drainage canal is potentially reduced.

Under a fourth procedure, the data processor 20 or path planning module 60 fails to comply with the minimum cut parameter 40 and at least one of the other constraint data 38 such that no solution for a validated path plan or compliant planned path is reached.

Under a fifth procedure, that data processor 20 or path planning module 60 evaluates the minimum cut parameter 40 parameter, maximum cut parameter 42, and maximum slope parameter 46 on a downward direction on a point-by-point basis or vertex-by-vertex basis from a higher elevation (e.g., starting point 30) to a lower elevation along the planned path, whereas the data processor 20 or path planning module 60 evaluates the maximum slope parameter 46 on an upward direction on a point-by-point basis or vertex-by-vertex basis from a lower elevation (e.g., termination point 32) to a higher elevation along the planned path.

In step S307, the vehicle data processor 58 or the converter 62 converts the validated path into a digging plan of machine readable codes for execution by a machine for digging or forming of a drainage channel in conformance with the validated path.

FIG. 4A and FIG. 4B, collectively, illustrate a method for determining a digging plan for a machine for construction or digging of a drainage channel. The method of FIG. 4A and FIG. 4B, collectively, begins in step S100.

In step S100, a location-determining receiver 12 collects terrain data (e.g., elevation data 16 and location data 18) for a work area. The location-determining receiver 12, alone or in combination with the data processor 20, may store the collected terrain data in the data storage device 14 for subsequent reference.

In step S102, a path planning module 60 or data processor 20 plans a path of the drainage channel (e.g., canal or ditch) within the work area via a user interface 26 consistent with the terrain data. For example, the user may enter one or more of the following: a starting point 30, a termination point 32, an intermediate point 34, and a target evaluation data 36. The user may also enter or select target values or target ranges for constraint data or other design parameters for the planned path. The constraint data may be selected based on erosion studies of the work area or soil surveys, or soil characteristics of the work area, for example.

In step S104, the data processor 20 determines if a minimum cut parameter 40 is satisfied for the planned path based on the collected terrain data. The minimum cut parameter 40 comprises a minimum volume of material to be removed to form the drainage channel with a desired minimum cross section, a minimum width, minimum depth or a minimum flow rate for liquid to travel in a single stream. If the minimum cut parameter 40 parameter is satisfied for the planned path based on the collected terrain data, the method continues with step S108. However, if the data processor 20 or path planning module 60 determines that the minimum cut parameter 40 parameter is not satisfied the method terminates without a solution in step S106.

In step S108, the data processor 20 or path planning module 60 determines if a minimum slope parameter 44 is satisfied for the planned path based on the collected terrain data. The minimum slope parameter 44 comprises a minimum incline for a liquid to flow from gravitational force. If the minimum slope parameter 44 is satisfied for the planned path based on the collected terrain data, the method continues with step S112. However, if the data processor 20 path planning module 60 determines that the minimum slope parameter 44 is not satisfied the method continues with step S110.

In step S110, a data processor 20 or path planning module 60 evaluates a planned path in a down slope direction starting from a higher elevation point along the planned path to increase a slope of the planned path consistent with a minimum slope parameter 44. Step S110 may be executed in accordance with various techniques that may be applied alternately, or cumulatively. In accordance with a first technique, the path planning module 60 or the data processor 20 evaluates the planned path in a down slope direction starting from a higher elevation point (e.g., a starting point 30 or nearest vertex to the starting point 30) along the planned path if the minimum slope parameter 44 is not satisfied. Further, the path planning module 60 or data processor 20 increases a slope of the planned path in the down slope direction consistent with the minimum slope parameter 44.

In accordance with a second technique, the path planning module 60 or data processor 20 increases the slope of the planned path in the down slope direction incrementally and iteratively until the minimum slope parameter 44 is satisfied. In accordance with a third technique, the path planning module 60 comprises a search engine for increasing the slope incrementally and iteratively until the minimum slope parameter 44 is satisfied. Step S112 may be executed after step S110 or after step S108, for example.

In accordance with a fourth technique, step S108 is executed at least once or iteratively after step S110, until the minimum slope parameter is satisfied in step S108. Notwithstanding any language to the contrary, once the minimum slope parameter is satisfied, the method continues with step S112.

In step S112, the data processor 20 or path planning module 60 determines if a maximum cut parameter 42 is satisfied for the planned path based on the collected terrain data. The maximum cut parameter 42 comprises a maximum volume of material to be removed to form the drainage channel. If the maximum cut parameter 42 is satisfied for the planned path based on the collected terrain data, the method continues with step S114. However, if the data processor 20 determines that the maximum cut parameter 42 is not satisfied the method terminates without a solution in step S116.

In step S114, the data processor 20 determines if a maximum slope parameter 46 is satisfied for the planned path based on the collected terrain data. The maximum slope parameter 46 comprises the maximum incline for liquid to flow without material erosion of the drainage channel. The maximum slope parameter 46 may depend upon the soil or material consistency of the ground or terrain in which the drainage channel is planned. If the maximum slope parameter 46 is satisfied for the planned path based on the collected terrain data, the method continues with step S120. However, if the data processor 20 determines that the maximum slope parameter 46 is not satisfied the method continues with step S118.

In step S118, the data processor 20 evaluates a planned path in the upslope direction starting from a lower elevation point along the planned path to decrease slope consistent with the maximum slope parameter 46. Step S120 may be executed following step S118 or step S114, for example.

Step S118 may be executed in accordance with various techniques that may be applied alternately, or cumulatively. In accordance with a first technique, the path planning module 60 or the data processor 20 evaluates the planned path in an upslope direction starting from a lower elevation point (e.g., a termination point 32 or nearest vertex from the termination point) along the planned path if the maximum slope parameter 46 is not satisfied. Further, the path planning module 60 or data processor 20 decreases a slope of the planned path in the upslope direction consistent with the maximum slope parameter 46. In accordance with a second technique, the path planning module 60 or data processor 20 decreases the slope of the planned path in the upslope direction incrementally and iteratively until the maximum slope parameter 46 is satisfied. In accordance with a third technique, the path planning module 60 comprises a search engine for decreasing the slope incrementally and iteratively until the maximum slope parameter 46 is satisfied.

In accordance with a fourth technique, step S114 is executed at least once or iteratively after step S118, until the maximum slope parameter is satisfied in step S114. Notwithstanding any language to the contrary, once the minimum slope parameter is satisfied, the method continues with step S120.

In step S120, a data processor 20 or path planning module 60 generates a validated path plan consistent with the minimum cut parameter 40, the maximum cut parameter 42, the minimum slope parameter 44, and the maximum slope parameter 46, the terrain and the planned path. The validated path plan is a planned path that meets the constraint data.

In step S122, the data processor 20 or converter 58 converts the validated path plan into a digging plan or dig plan with machine control codes to execute the digging or construction of the drainage channel. For example, the data processor 20 or the converter 58 may apply rules or a mapping function to generate a dig plan for each path segment of the validated path.

In step S124, the vehicular controller and digging controller 78 support the digging or construction of the drainage channel in conformance with the machine control codes and the dig plan.

FIG. 5A and FIG. 5B, collectively, represent an illustrative example of modifying the dig plan to meet constraint data 38. FIG. 5A and FIG. 5B, collectively, provide an illustration of potential execution of step S306 of FIG. 3 or steps S114 and S118 of FIG. 4A.

FIG. 5 shows an illustrative noncompliant planned path that violates constraint data 38; namely, the maximum slope parameter 46. The noncompliant planned path of FIG. 5A has a starting point 30 of A, a termination point 32 of D, and intermediate vertices B and C. Similarly, the compliant planned path of FIG. B has the starting point 30 of A, the termination point 32 of D, and intermediate vertices B and C.

In step S114, the data processor 20 or path planning module 61 determines whether the maximum slope parameter 46 is satisfied for the planned path of FIG. 5A based on the collected terrain data. Here, in evaluating the planned path of FIG. 5A in a downward direction starting from the starting point 30 of A, the data processor 20 determines that the slope of the BC path segment, with respect to level ground or the AB path segment, exceeds the maximum slope parameter 46. FIG. 5B shows the planned path of FIG. 5A after the data processor 20 or the path planning module 60 adjusts it to meet the maximum slope parameter 46. Accordingly, in FIG. 5B, the data processor 20 first lowers point B to comply with the maximum slope parameter 46 in the downward direction and then the data processor 20 secondarily looks upward from point B to point A to determine if the maximum slope is exceeded for segment AB with respect to level ground or another reference angle. In FIG. 5B, starting point 30 of A is lowered in elevation to reduce the maximum slope of path segment AB to comply with the maximum slope parameter 46.

The method and system supports efficient and rapid determination of a validated path plan by changing the direction of analysis when evaluating the compliance of path segments with the constraint data. The changing of the direction of analysis offers proper perspective for a corresponding type of constraint data to avoid computational delay and complexity that might otherwise result. Further, the validated path plan is readily converted to a digging plan for execution by a digging machine, rather than merely presenting a graphical image to a user of the validated path plan.

Having described the preferred embodiment, it will become apparent that various modifications can be made without departing from the scope of the invention as defined in the accompanying claims.

The following is claimed:

1. A method for providing a planned path for a machine for digging a drainage channel, the method comprising:
   collecting terrain data within a work area, the terrain data comprising elevation data and corresponding location data;
   defining a planned path for a drainage channel, the planned path comprising a starting point with first coordinates and a termination point with second coordinates within the work area, the drainage channel to extend from the starting point to the end point such that the starting point has a higher elevation than the termination point;
   establishing constraint data comprising a minimum cut parameter, a maximum cut parameter, a minimum slope parameter and a maximum slope parameter; and
   determining a validated path for the drainage channel based on compliance with the constraint data.

2. The method according to claim 1 further comprising:
   converting the validated path into a digging plan with machine control codes to execute the digging or construction of the drainage channel.

3. The method according to claim 1 further comprising:
   digging or constructing the drainage channel in conformance with the machine control codes and the digging plan.

4. The method according to claim 1 wherein the determining of the validated path further comprises:
   evaluating the planned path in a down slope direction starting from a higher elevation point along the planned path if the minimum slope parameter is not satisfied; and
   increasing a slope of the planned path in the down slope direction consistent with the minimum slope parameter.

5. The method according to claim 4 wherein the increasing is done incrementally and iteratively until the minimum slope parameter is satisfied.

6. The method according to claim 1 wherein the determining of the dig plan further comprises:
   evaluating the planned path in an upslope direction starting from a lower elevation point along the planned path if the maximum slope parameter is not satisfied; and
   decreasing a slope of the planned path in the upslope direction consistent with the maximum slope parameter.

7. The method according to claim 6 wherein the decreasing is done incrementally and iteratively until the maximum slope parameter is satisfied.

8. The method according to claim 1 wherein the determining of the validated path is accomplished by, first, applying the minimum cut parameter; second, applying the minimum slope parameter; third, applying the maximum cut parameter; fourth, applying the maximum slope parameter.

9. The method according to claim 1 wherein the minimum cut parameter comprises a minimum volume of material to be removed to form the drainage channel with a desired minimum cross section, a minimum width, minimum depth or a minimum flow rate for liquid to travel in a single stream; wherein the minimum slope parameter comprises a minimum incline for a liquid to flow from gravitational force; wherein the maximum cut parameter comprises a maximum volume of material to be removed to form the drainage channel; and wherein maximum slope parameter comprises the maximum incline for liquid to flow without material erosion of the drainage channel.

10. A system for providing a planned path for a machine for digging a drainage channel, the system comprising:
    a location determining receiver for collecting terrain data within a work area, the terrain data comprising elevation data and corresponding location data;
    a path planning module for defining a planned path for a drainage channel, the planned path comprising a starting point with first coordinates and a termination point with second coordinates within the work area, the drainage channel to extend from the starting point to the end point such that the starting point has a higher elevation than the termination point;
    a user interface for establishing constraint data comprising a minimum cut parameter, a maximum cut parameter, a minimum slope parameter and a maximum slope parameter; and
    a data processor for determining a validated path for the drainage channel based on compliance with the constraint data.

11. The system according to claim 10 further comprising:
    a converter for converting the validated path into a digging plan with machine control codes to execute the digging or construction of the drainage channel.

12. The system according to claim 10 further comprising:
    an actuator for digging or constructing the drainage channel in conformance with the machine control codes and the digging plan.

13. The system according to claim 10 wherein data processor further comprises:
    a path planning module for evaluating the planned path in a down slope direction starting from a higher elevation point along the planned path if the minimum slope parameter is not satisfied, the path planning module arranged to increase a slope of the planned path in the down slope direction consistent with the minimum slope parameter.

14. The system according to claim 13 wherein the path planning module comprises a search engine for increasing the slope incrementally and iteratively until the minimum slope parameter is satisfied.

15. The system according to claim 10 wherein the data processor further comprises:
    a path planning module for evaluating the planned path in an upslope direction starting from a lower elevation point along the planned path if the maximum slope parameter is not satisfied, the path planning module arranged to decrease a slope of the planned path in the upslope direction consistent with the maximum slope parameter.

16. The system according to claim 15 wherein the path planning module comprises a search engine for decreasing the slope incrementally and iteratively until the maximum slope parameter is satisfied.

17. The system according to claim 10 wherein the minimum cut parameter comprises a minimum volume of material to be removed to form the drainage channel with a desired minimum cross section, a minimum width, minimum depth or a minimum flow rate for liquid to travel in a single stream; wherein the minimum slope parameter comprises a minimum incline for a liquid to flow from gravitational force; wherein the maximum cut parameter comprises a maximum volume of material to be removed to form the drainage channel; and wherein the maximum slope parameter comprises the maximum incline for liquid to flow without material erosion of the drainage channel.

* * * * *